United States Patent
Ohno et al.

(10) Patent No.: US 11,465,046 B2
(45) Date of Patent: Oct. 11, 2022

(54) VIDEO GAME PROCESSING PROGRAM AND VIDEO GAME PROCESSING SYSTEM

(71) Applicant: KABUSHIKI KAISHA SQUARE ENIX, Tokyo (JP)

(72) Inventors: Hiroaki Ohno, Shinjuku-ku (JP); Kei Odagiri, Shinjuku-ku (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 32 days.

(21) Appl. No.: 15/696,798

(22) Filed: Sep. 6, 2017

(65) Prior Publication Data
US 2018/0071629 A1 Mar. 15, 2018

(30) Foreign Application Priority Data
Sep. 13, 2016 (JP) .............................. JP2016-178815

(51) Int. Cl.
*A63F 13/525* (2014.01)
*A63F 13/35* (2014.01)
*A63F 13/45* (2014.01)

(52) U.S. Cl.
CPC ............ *A63F 13/525* (2014.09); *A63F 13/35* (2014.09); *A63F 13/45* (2014.09); *A63F 2300/5533* (2013.01)

(58) Field of Classification Search
CPC ......... A63F 13/525; A63F 13/35; A63F 13/45
See application file for complete search history.

(56) References Cited

U.S. PATENT DOCUMENTS 6,280,323 B1 8/2001 Yamazaki et al.
6,738,059 B1 * 5/2004 Yoshinaga .............. A63F 13/10
345/419

(Continued)

FOREIGN PATENT DOCUMENTS

JP 10-201958 8/1998
JP 2003-053044 2/2003

(Continued)

OTHER PUBLICATIONS

Office Action from Japan Patent Office (JPO) in Japanese Patent Appl. No. 2016-178815, dated Apr. 10, 2018, together with a partial English language translation.

(Continued)

*Primary Examiner* — Thomas H Henry
(74) *Attorney, Agent, or Firm* — Greenblum & Bernstein, P.L.C.

(57) ABSTRACT

A non-transitory computer-readable medium including a video game processing program product for causing a server to realize functions to control progress of a video game in response to an operation of a user is provided. The functions include: a motion control function configured to refer to a storing section to cause an object to carry out a motion specified by the user, a series of actions (hereinafter, referred to as a "motion") being stored in the storing section in advance, the object being to be caused to carry out the series of actions; a stopping function configured to cause the motion, which the object is carrying out, to stop on the way on the basis of an operation of the user; and a proceeding function configured to cause the video game to proceed in a state where the motion of the object is stopped on the way on the basis of the stopping function.

10 Claims, 8 Drawing Sheets

(56) References Cited

U.S. PATENT DOCUMENTS

| | | | |
|---|---|---|---|
| 2004/0119733 | A1 | 6/2004 | Morimoto et al. |
| 2008/0015003 | A1* | 1/2008 | Walker .................. A63F 13/10 463/1 |
| 2010/0160040 | A1 | 6/2010 | Ikeda |
| 2012/0115556 | A1* | 5/2012 | Sogabe .................. A63F 13/58 463/3 |
| 2017/0080344 | A1 | 3/2017 | Odagiri et al. |
| 2018/0015375 | A1* | 1/2018 | Marino ................. A63F 13/843 |
| 2018/0071629 | A1 | 3/2018 | Ohno et al. |

FOREIGN PATENT DOCUMENTS

| | | |
|---|---|---|
| JP | 2003-117239 | 4/2003 |
| JP | 2004-070821 | 3/2004 |
| JP | 2006-020849 | 1/2006 |
| JP | 2008-264244 | 11/2008 |
| JP | 2007-029624 | 2/2010 |
| JP | 2010-035562 | 2/2010 |
| JP | 2010-142305 | 7/2010 |
| JP | 2010-259585 | 11/2010 |
| JP | 2012-213491 | 11/2012 |
| JP | 2015-058133 | 3/2015 |
| JP | 2017-056114 | 3/2017 |
| JP | 2018-042679 | 3/2018 |

OTHER PUBLICATIONS

Yukitaka Umemoto et. al., "Quarrel Bancho 5—Otoko no Hosoku—Official Guidebook 1st Edition", Enterbrain Inc., Mar. 11, 2011, 1st Edition, pp. 1, 39, 336, together with a partial English language translation.

"Final Fantasy Type-0 (Game Manual)", Square Enix Co., Ltd., Oct. 28, 2011, pp. 1, 22, 23.

Office Action from Japan Patent Office (JPO) in Japanese Patent Appl. No. 2016-178815, dated Aug. 29, 2017, together with an English language translation.

"SE-MOOK Dragon Quest VIII: Journey of the Cursed King—Official Guidebook", Square Enix Co., Ltd., Sep. 26, 2015, First Edition, pp. 1, 468-473, together with a partial English language translation.

"Pokemon Marugoto Koryaku Note" a supplement of November issue of DengekiNintendo DS, ASCII Media Works Inc., Aug. 20, 2011, pp. 1, 134-164, together with a partial English language translation.

Office Action from Japan Patent Office (JPO) in Japanese Patent Appl. No. 2016-178815, dated Jan. 22, 2019, together with a partial English language translation.

Office Action from Japan Patent Office (JPO) in Japanese Patent Appl. No. 2019-080911, dated Jun. 9, 2020, together with an English language translation.

\* cited by examiner

VIDEO GAME PROCESSING PROGRAM AND VIDEO GAME PROCESSING SYSTEM

CROSS-REFERENCE TO RELATED APPLICATION

The present application relates to subject matter contained in Japanese Patent Application No. 2016-178815 filed on Sep. 13, 2016, the disclosure of which is expressly incorporated herein by reference in its entirety.

BACKGROUND OF THE INVENTION

1. Field of the Invention

At least one of embodiments according to the present invention relates to a non-transitory computer-readable medium including a video game processing program and a video game processing system for causing a server to realize functions to control progress of a video game in response to an operation of a user.

2. Description of the Related Art

Heretofore, the number of multi-player video games in which a plurality of users participates and plays at the same time increases like an MMORPG (Massively Multiplayer Online Role-Playing Game). In such a multi-player video game, a method of causing an object, such as a player character operated by a user, to carry out a motion that is a series of actions defined in advance as one of communication means among users is used. As one example of the motion, there are "wave one's hand", "make a blow", "laugh or smile", "dance", and the like. Such a motion is used by the user as means for communicating feelings of the user to other user, for example.

Further, such a motion is also used in a case where the user wants to photograph a game screen. A photographing function to store a game screen may be provided in a video game itself, or photographing may be carried out by a screenshot by which a screen is stored in a personal computer or the like. However, a user often thinks that the user wants to cause an object operated by himself or herself to carry out photographing while or after carrying out a motion.

As one video game provided with such a photographing function, there is an invention described in Japanese Patent Application Publication No. 2003-117239 (hereinafter, referred to as "Patent Document 1"), for example. In this Patent Document 1, a user is allowed to store a game image of a certain scene in the video game and to browse the game image freely and arbitrarily after termination of the video game.

As described above, when an object such as a player character is caused to carry out a motion, the motion (or actions) continues in succession until a series of actions is terminated. Thus, in a case where a user wants to photograph an action state in the middle of the motion, the user is required to choose appropriate timing to carry out an operation corresponding to a shutter. In a case where a photographing target is only an object operated by one user, such a photographing method may go well. However, it may be difficult to match timing for a motion in which an action of an object is quick or the like.

SUMMARY OF THE INVENTION

It is an object of at least one of embodiments according to the present invention to solve the problem described above, and to provide a non-transitory computer-readable medium including a video game processing program product capable of facilitating photographing on the way of a motion.

According to one non-limiting aspect of the present invention, there is provided a non-transitory computer-readable medium including a video game processing program product for causing a server to realize functions to control progress of a video game in response to an operation of a user.

The functions include a motion control function configured to refer to a storing section to cause an object to carry out a motion specified by the user, a series of actions (hereinafter, referred to as a "motion") being stored in the storing section in advance, the object being to be caused to carry out the series of actions.

The functions also include a stopping function configured to cause the motion, which the object is carrying out, to stop on the way on the basis of an operation of the user.

The functions also include a proceeding function configured to cause the video game to proceed in a state where the motion of the object is stopped on the way on the basis of the stopping function.

According to another non-limiting aspect of the present invention, there is provided a non-transitory computer-readable medium including a video game processing program product for causing a user terminal to realize functions to control progress of a video game in response to an operation of a user.

The functions include a motion control function configured to refer to a storing section to cause an object to carry out a motion specified by the user, a series of actions (hereinafter, referred to as a "motion") being stored in the storing section in advance, the object being to be caused to carry out the series of actions.

The functions also include a stopping function configured to cause the motion, which the object is carrying out, to stop on the way on the basis of an operation of the user.

The functions also include a proceeding function configured to cause the video game to proceed in a state where the motion of the object is stopped on the way on the basis of the stopping function.

According to still another non-limiting aspect of the present invention, there is provided a video game processing system for controlling progress of a video game in response to an operation of a user, the video game processing system including a communication network, a server, and a user terminal.

The video game processing system includes a motion control section configured to refer to a storing section to cause an object to carry out a motion specified by the user, a series of actions (hereinafter, referred to as a "motion") being stored in the storing section in advance, the object being to be caused to carry out the series of actions.

The video game processing system also includes a stopping section configured to cause the motion, which the object is carrying out, to stop on the way on the basis of an operation of the user.

The video game processing system also includes a proceeding section configured to cause the video game to proceed in a state where the motion of the object is stopped on the way on the basis of a function of the stopping section.

According to each of the embodiments of the present application, one or two or more shortages are solved.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings.

DETAILED DESCRIPTION OF THE INVENTION

Hereinafter, examples of embodiments according to the present invention will be described with reference to the drawings. In this regard, various kinds of elements in an example of each embodiment, which will be described below, can appropriately be combined with each other in a range where contradiction or the like did not occur. Further, explanation of the content that will be described as an example of an embodiment may be omitted in another embodiment. Further, the content of operations and/or processing with no relationship to characteristic portions of each embodiment may be omitted. Moreover, various kinds of processing that constitute various kinds of processing flows (will be described below) may be carried out in random order in a range where contradiction or the like did not occur in the content of the processing.

First Embodiment

Figure 1:
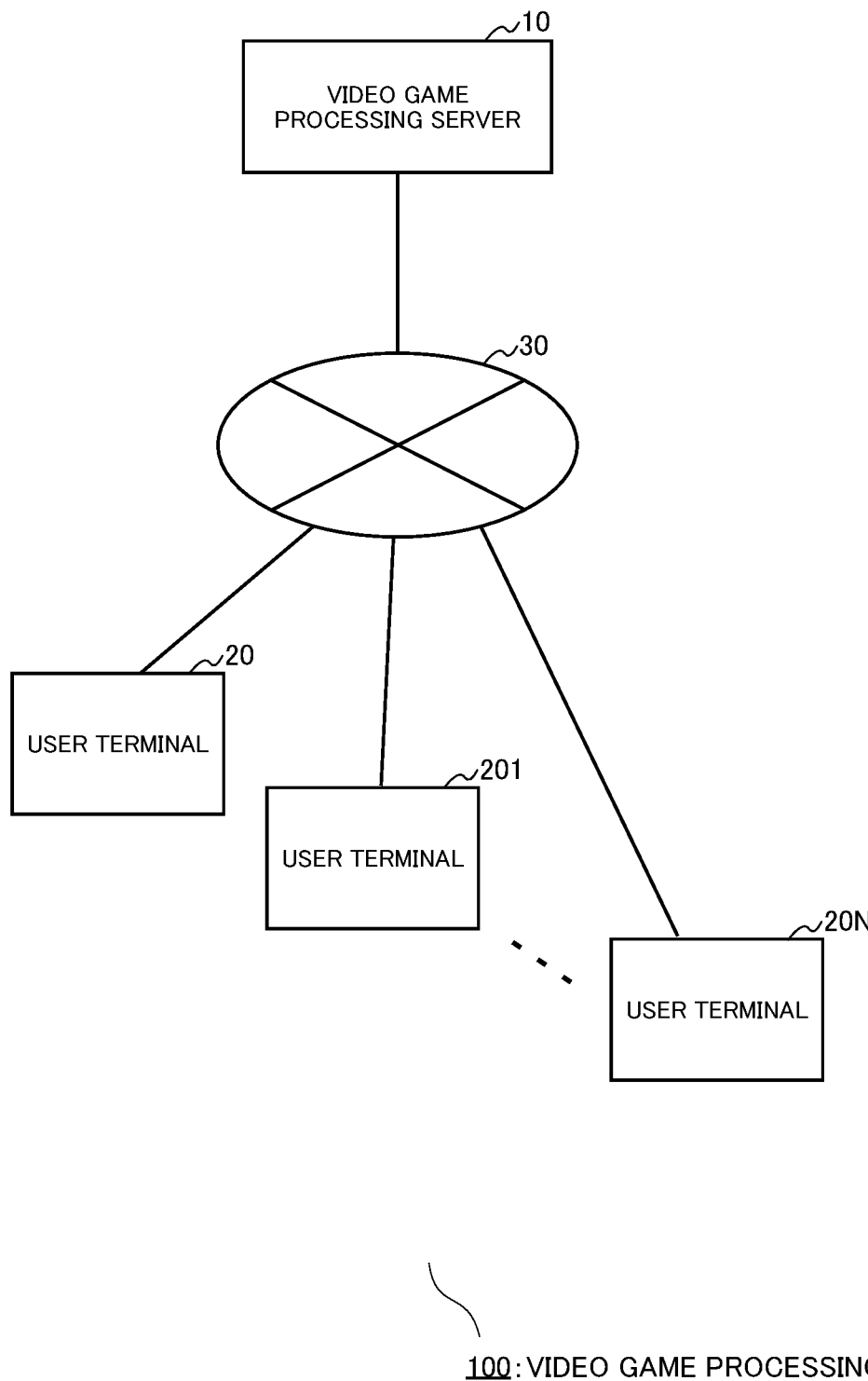
FIG. 1 is a block diagram showing an example of a configuration of a video game processing system corresponding to at least one of embodiments according to the present invention.

FIG. 1 is a block diagram showing an example of a configuration of a video game processing system 100 according to one embodiment of the present invention. As shown in FIG. 1, the video game processing system 100 includes a video game processing server 10 (hereinafter, referred to as a "server 10") and user terminals 20 and 201 to 20N ("N" is an arbitrary integer) respectively used by users of the video game processing system 100. In this regard, the configuration of the video game processing system 100 is not limited to this configuration. The video game processing system 100 may be configured so that the plurality of users uses a single user terminal, or may be configured so as to include a plurality of servers.

Each of the server 10A and the plurality of user terminals 20 and 201 to 20N is connected to a communication network 30 such as the Internet. In this regard, although it is not shown in the drawings, the plurality of user terminals 20 and 201 to 20N is connected to the communication network 30 by carrying out data communication with base stations managed by a telecommunication carrier by means of a radio communication line.

The video game processing system 100 includes the server 10A and the plurality of user terminals 20 and 201 to 20N, whereby various kinds of functions for carrying out various kinds of processing in response to an operation of the user are realized.

The server 10 is managed by an administrator of the video game processing system 100, and has various kinds of functions to provide information regarding various kinds of processing to the plurality of user terminals 20 and 201 to 20N. In the present embodiment, the server 10 is constructed by an information processing apparatus, such as a WWW server, and includes a storage medium for storing various kinds of information. In this regard, the server 10 is provided with a general configuration for carrying out the various kinds of processing as a computer, such as a control section and a communicating section. However, its explanation herein is omitted. Further, in the video game processing system 100, it is preferable that the server 10 manages various kinds of information from a point of view to reduce a processing load on each of the plurality of user terminals 20 and 201 to 20N. However, a storing section for storing various kinds of information may include a storage region in a state where the server 10C can access the storage region. For example, the server 10 may be configured so as to be provided with a dedicated storage region outside the server 10.

Each of the plurality of user terminals 20, 201 to 20N is managed by a user, and is configured by a communication terminal, such as a cellular phone terminal, a PDA (Personal Digital Assistants), a mobile game device, and a so-called wearable divide, by which the user can play a network delivery type game, for example. In this regard, a configuration of the user terminal that the video game processing system 100 can include is not limited to the examples described above. It may be a configuration in which the user can recognize a video game. As other examples of the user terminal, there is a combination of a so-called wearable device, such as a smart watch, and a communication terminal or the like configured to communicate with the wearable device.

Further, each of the plurality of user terminals 20, 201 to 20N is connected to the communication network 30, and includes hardware (for example, a display device for displaying a browser screen and a game screen according to a coordinate and the like) and software for carrying out various kinds of processing by communicating with the server 10. In this regard, each of the plurality of user terminals 20, 201 to 20N may be configured so as to be capable of directly communicating with each other without the server 10.

In a stage to carry out game processing of the video game, the server 10 transmits a process stage to the user terminal 20 appropriately. The user terminal 20 causes a display device to display a game screen based on the content of the received process stage on a display screen. Generation of the game screen may be carried out at the server 10 side, or it may be carried out at the user terminal 20 side.

Here, the game screen means a screen that shows a virtual space (or a game space). In this regard, in the present embodiment, various kinds of elements that constitute a game screen may be referred to as an "image". The configuration of the game screen is not limited particularly so long as the user can recognize a status of the video game.

Further, the phrase "cause the display device to display the game screen on the display screen" means that the display device included in the user terminal 20 or the like is caused to output the game screen by means of communication using the communication network 30. As an example of the configuration to cause the display device to display the game screen, there is a configuration in which information generated at the server 10 side (hereinafter, referred to as "output information") is transmitted to a user terminal side. In this regard, the configuration of the output information is not limited particularly. The output information may be information in which an image is compressed, or information for causing the terminal side to generate an image, for example. As an example of the information in which the image is compressed, there is one used in a cloud game (for example, MPEG). Further, as information for generating an image at the terminal side, there is one used in an online game (for example, positional information of an object).

Figure 2:
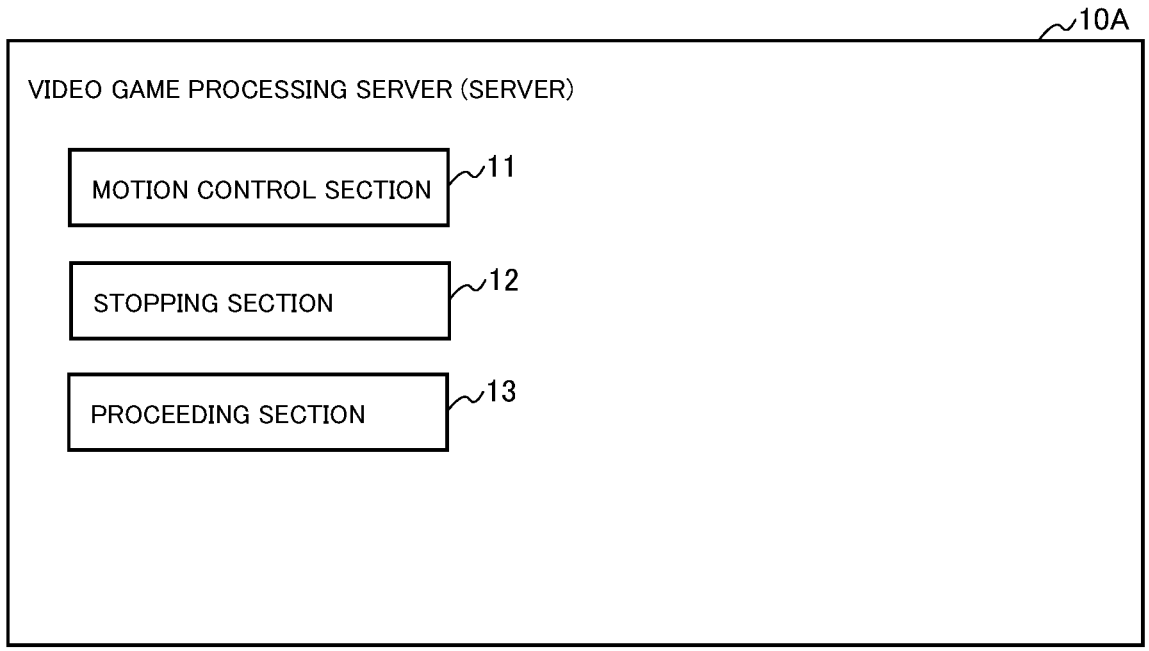
FIG. 2 is a block diagram showing a configuration of a video game processing server corresponding to at least one of the embodiments according to the present invention.

FIG. 2 is a block diagram showing a configuration of a video game processing server 10A (hereinafter, referred to as a "server 10A"), which is an example of the configuration of the server 10. As shown in FIG. 2, the server 10A at least includes a motion control section 11, a stopping section 12, and a proceeding section 13.

The motion control section 11 has a function to cause an object to carry out a motion specified by the user.

The object is an object or subject that exists in the video game. The object that is a target according to the present embodiment is an object that can be caused to carry out some kind of action. As examples of the object, there are an object that is an operational target of the user such as a player character, an object that is an operational target of other user, an object that is a non-player character acting without an operation of any user, and the like, for example. As for how to express or present an object in the video game, the object may be expressed or presented by three-dimensional polygons, or may be expressed or presented by a 2D animation. Thus, the object may be expressed or presented by any expression way or form so long as the object can be expressed or presented.

The motion denotes a series of actions that the object is caused to carry out. As the motion, various actions or operations, such as "make a blow", "wave one's hand", "dance", and "carry out shadow boxing", for example, are thought. A motion control is carried out as follows, for example. Namely, data necessary to cause the object to carry out a series of actions are stored in advance in a storing section for every motion. In a case where an execution instruction for a motion is given to the object, data for the corresponding motion is obtained from the storing section to cause the object to carry out the motion. For example, in a case where the object is expressed or presented by the three-dimensional polygons, data on actions that the object expressed by three-dimensional polygons is caused to carry out are stored in the storing section. An installation location of the storing section is not limited particularly. The storing section may be provided in the server 10A, or the storing section may be provided in the user terminal 20. In this regard, the server 10A may be configured so as to provide only one kind of motion. Alternatively, the server 10A may be configured so that plural kinds of motions are stored in the storing section and the object can be caused to carry out a motion selected by the user.

The stopping section 12 has a function to cause the motion, which the object is carrying out on the basis of a function of the motion control section 11, to stop on the way. The word "stop" denotes that an action of the object is caused to stop at a posture state on the way of the motion, but does not contain cancellation of the motion that is being carried out. The motion is normally a series of actions that is not caused to stop on the way. However, the stopping section 12 is configured to cause a motion, which the object is carrying out, to stop on the way as a trigger that a predetermined condition is satisfied. The stopping section 12 stops the motion in the middle of execution in a case where a condition to stop the motion is satisfied.

The proceeding section 13 has a function to cause the video game to proceed in a state where the motion of the object is stopped on the way on the basis of the function of the stopping section 12. Even though the motion of the object is stopped on the way on the basis of the function of the stopping section 12, the proceeding section 13 does not cause progress of the video game to stop, but continuously cause the video game to proceed. The process of the proceeding section 13 is different from a conventional temporarily stopping process (or a pausing process) in which the whole video game stops due to a rest or the like for the user. The proceeding section 13 stops only the object, but continues to cause the video game to proceed.

Figure 3:
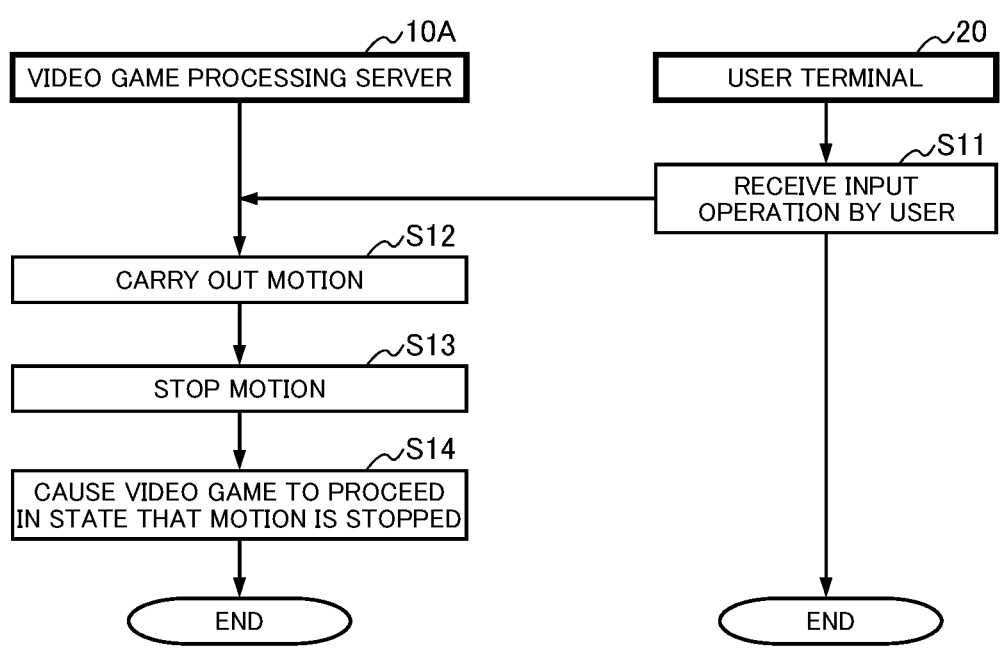
FIG. 3 is a flowchart showing an example of game processing corresponding to at least one of the embodiments according to the present invention.

FIG. 3 is a flowchart showing an example of the game processing carried out by the video game processing system 100. Hereinafter, the case where the server 10A and the user terminal 20 (or the terminal 20) carry out the game processing will be described as an example.

The game processing is started in a state where the object can be caused to carry out the motion, for example. After starting the game processing, the user terminal 20 receives an input operation carried out by the user. For example, when an input operation is carried out by the user as an execution instruction for the motion, the user terminal 20 transmits, to the server 10A, information indicating that the input operation is carried out (Step S11). The server 10A carries out a process to cause the object to carry out the motion specified on the basis of an operation of the user (Step S12). In principle, the object that is caused to carryout the motion is controlled so as to continuously carry out a series of actions until the motion operation is terminated. In a case where a predetermined condition to stop the motion is satisfied in the middle of causing the object to carry out the motion, the server 10A causes the motion in the middle of execution to stop (Step S13). Even though the motion in the middle of execution is caused to stop, the server 10A causes the video game to proceed in a state where the motion of the object is caused to stop on the way (Step S14).

Figure 4:
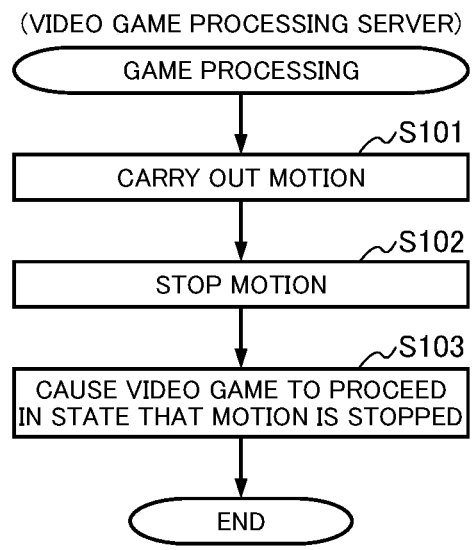
FIG. 4 is a flowchart showing an example of an operation of a server side in the game processing corresponding to at least one of the embodiments according to the present invention.

FIG. 4 is a flowchart showing an example of an operation of the server 10A side in the game processing. Here, an operation of the server 10A in the video game processing system 100 will be described.

The server 10A carries out a process to cause the object to carry out the motion specified on the basis of an operation of the user (Step S101). In principle, the object that is caused to carry out the motion is controlled so as to continuously carry out a series of actions until the motion operation is terminated. However, in a case where a predetermined condition to stop the motion is satisfied in the middle of causing the object to carry out the motion, the server 10A causes the motion in the middle of execution to stop (Step S102). Even though the motion in the middle of execution is caused to stop, the server 10A causes the video game to proceed in a state where the motion of the object is caused to stop on the way (Step S103).

Figure 5:
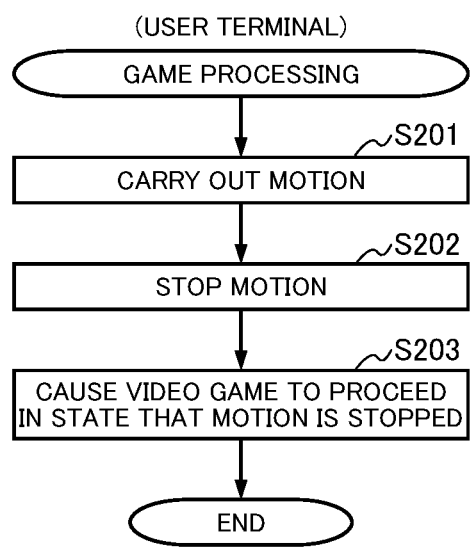
FIG. 5 is a flowchart showing an example of an operation of a user terminal side in the game processing corresponding to at least one of the embodiments according to the present invention.

FIG. 5 is a flowchart showing an example of an operation of the user terminal 20 side in a case where the user terminal 20 carries out the game processing. Hereinafter, the case where the user terminal 20 carries out the game processing by a single body will be described as an example. In this regard, the user terminal 20 is configured so as to include similar functions to those of the server 10 except for a function to receive various kinds of information from the server 10. For this reason, description of components or portions that have already been explained will be omitted from a point of view to avoid repeated explanation.

The user terminal 20 carries out a process to cause the object to carry out the motion specified on the basis of an operation of the user (Step S201). In principle, the object that is caused to carry out the motion is controlled so as to continuously carry out a series of actions until the motion operation is terminated. However, in a case where a predetermined condition to stop the motion is satisfied in the middle of causing the object to carry out the motion, the user terminal 20 causes the motion in the middle of execution to stop (Step S202). Even though the motion in the middle of execution is caused to stop, the user terminal 20 causes the video game to proceed in a state where the motion of the object is caused to stop on the way (Step S203).

As explained above, as one side of the first embodiment, the server 10A provided with the functions to control progress of the video game in response to an operation of the user is configured so as to include the motion control section 11, the stopping section 12, and the proceeding section 13. Thus, the motion control section 11 refers to the storing section in which the motions are stored in advance and to cause the object to carry out the motion specified by the user; the stopping section 12 cause the motion, which the object is carrying out on the basis of the motion control section 11, to stop on the way; and the proceeding section 13 causes the video game to proceed in a state where the motion of the object is stopped on the way on the basis of the function of the stopping section 12. Therefore, it is possible to facilitate photographing so that a posture of the object in the middle of the motion becomes a posture desired by the user.

Namely, it is possible to realize the posture that the user wants to cause the object to take by stopping the action of the object in the middle of the motion. For this reason, there is an effect that the user is allowed to adjust the posture of the object before pressing a shutter for photographing. In particular, in a multi-player video game in which a plurality of users participates in and plays at the same time, like an MMORPG, this is beneficial in a situation where the user wants to carry out photographing together with other user. This is because even though one user causes a motion of an object that is his or her operational target to stop, the video game proceeds as it is, whereby this does not affect a process to carry out or stop a motion of another object operated by other user. Thus, each of the users can follow the steps to: stop the motion of the object, which is his or her operational target, at his or her timing; select a posture for the object; and finally carry out photographing. Therefore, there is an effect that all of the users can respectively carry out photographing with postures desired by the users at one photographing chance or timing.

Second Embodiment

Figure 6:
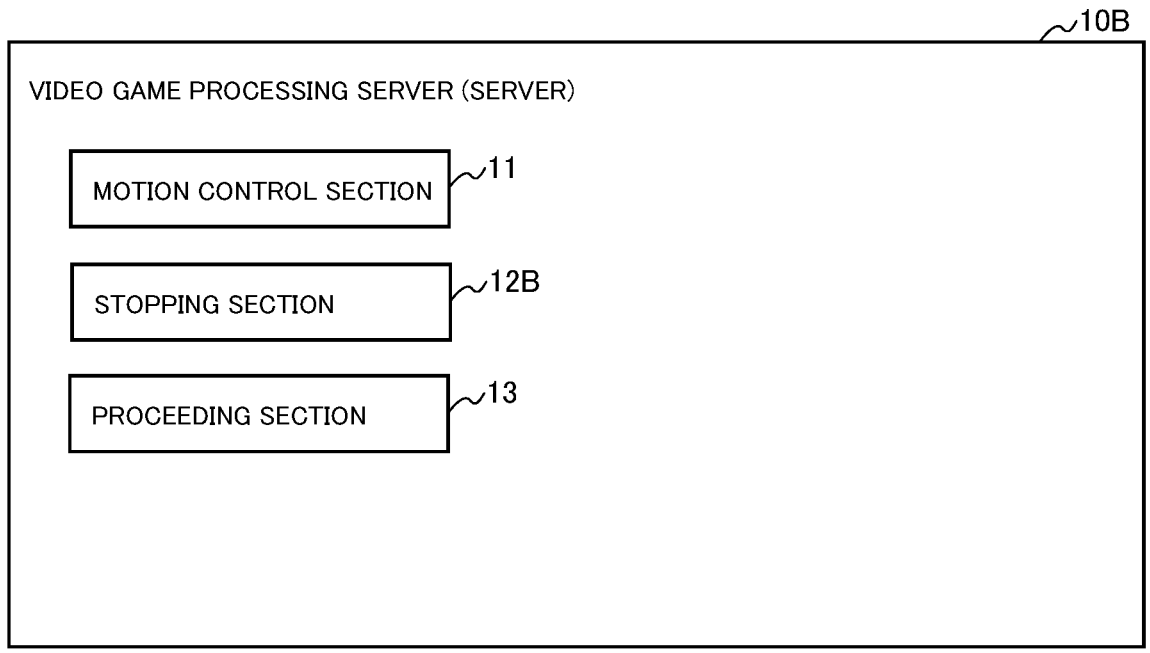
FIG. 6 is a block diagram showing a configuration of a video game processing server corresponding to at least one of the embodiments according to the present invention.

FIG. 6 is a block diagram showing a configuration of a video game processing server 10B (hereinafter, referred to as a "server 10B"), which is an example of the configuration of the server 10. As shown in FIG. 6, the server 10B at least includes a motion control section 11, a stopping section 12B, and a proceeding section 13.

The stopping section 12B has a function to cause a motion, which an object carries out on the basis of the motion control section 11, to stop on the way. Moreover, the stopping section 12B also has a function to cause the motion of the object to stop at the time of receiving a predetermined input operation from a user. The predetermined input operation by the user denotes an input operation associated with a process to stop the motion of the object. In the stopping section 12B, reception (or execution) of the predetermined input operation by the user is a predetermined condition to stop the motion. Here, the phrase "at the time of receiving a predetermined input operation" means when the predetermined input operation is carried out by the user. However, a relationship between the time of receiving the input operation and time to cause the motion of the object to stop is not limited particularly so long as the user is allowed to recognize that the motion is stopped in response to the input operation. As examples of the relationship between the time of receiving the input operation and the time to cause the motion of the object to stop, there are a relationship that timing of receiving the input operation is substantially the same as timing to cause the motion to stop, and a relationship that a predetermined process is carried out between the timing of receiving the input operation and the timing to cause the motion to stop. The predetermined input operation to stop the motion corresponds to an operation to press a button corresponding to a shutter, for example. In a case where a predetermined input operation for stop is carried out by the user, the motion in the middle of execution is caused to stop.

Figure 7:
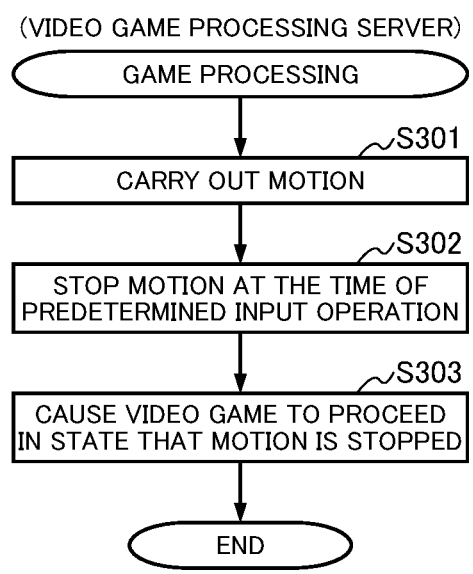
FIG. 7 is a flowchart showing an example of an operation of the server side in the game processing corresponding to at least one of the embodiments according to the present invention.

FIG. 7 is a flowchart showing an example of an operation of the server 10B side in the game processing. Here, an operation of the server 10B in the video game processing system 100 will be described.

The server 10B carries out processing to cause an object to carry out a process to execute a motion specified on the basis of an operation of a user (Step S301). In principle, the object that is caused to carry out the motion is controlled so as to continuously carry out a series of actions until the motion operation is terminated. However, in a case where a predetermined input operation to stop the motion is carried out by the user in the middle of causing the object to carry out the motion, the server 10B causes the motion in the middle of execution to stop (Step S302). Even though the motion in the middle of execution is caused to stop, the server 10B causes the video game to proceed in a state where the motion of the object is caused to stop on the way (Step S303).

As explained above, as one side of the second embodiment, the server 10B provided with the functions to control progress of the video game in response to an operation of the user is configured so as to include the motion control section 11, the stopping section 12B, and the proceeding section 13. Thus, the stopping section 12B causes the motion of the object to stop at the time of receiving the predetermined input operation from the user. Therefore, it is possible to facilitate photographing so that a posture of the object in the middle of the motion becomes a posture desired by the user.

Namely, the motion of the object can be stopped at the time of receiving the predetermined input operation of the user. Thus, the user is allowed to stop the motion by carrying out the predetermined input operation at arbitrary timing while watching the motion that the object is caused to carry out. Therefore, there is an effect to facilitate that the object is caused to stop in a posture state that the user desires.

Third Embodiment

Figure 8:
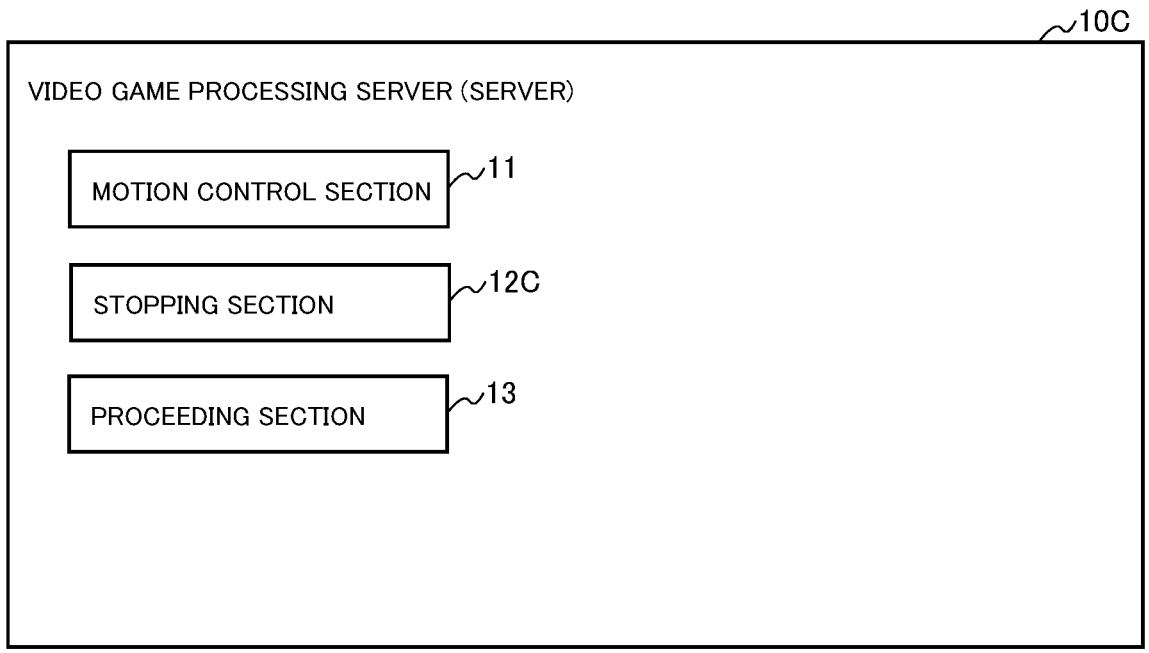
FIG. 8 is a block diagram showing a configuration of a video game processing server corresponding to at least one of the embodiments according to the present invention.

FIG. 8 is a block diagram showing a configuration of a video game processing server 10C (hereinafter, referred to as a "server 10C"), which is an example of a configuration of the server 10. As shown in FIG. 8, the server 10C at least includes a motion control section 11, a stopping section 12C, and a proceeding section 13.

The stopping section 12C has a function to cause a motion, which an object is carrying out on the basis of a function of the motion control section 11, to stop on the way. Moreover, the stopping section 12C has a function to specify that the motion is stopped after a predetermined period of time elapses since the object was caused to carry out the motion. The stopping section 12C can specify that a motion is stopped after a predetermined period of time elapses since an object is caused to carry out the motion. This is a predetermined condition to stop the motion. The phrase "can specify" means that the user is allowed to in advance specify a period of time from the time when the object starts to carry out the motion to the object stops the motion before the object is caused to carry out the motion. In this regard, the configuration to specify this time (or timing) is not limited particularly. However, it is preferable that the server 10C is configured so that the user can specify an arbitrary time. As an example of such a configuration, there is a configuration in which a game screen, by which it can be specified how many seconds is the motion stopped after start of the motion at the same time, is displayed at the time of receiving the input operation to cause the object to the motion and an input operation by the user to specify seconds (specified seconds) is received through the game screen, for example. The specified seconds may be specified in 0.1 seconds, for example. When the motion is started in a state where a stop time is specified, the stopping section 12C stops the motion in the middle of execution after the specified period of time elapses.

Figure 9:
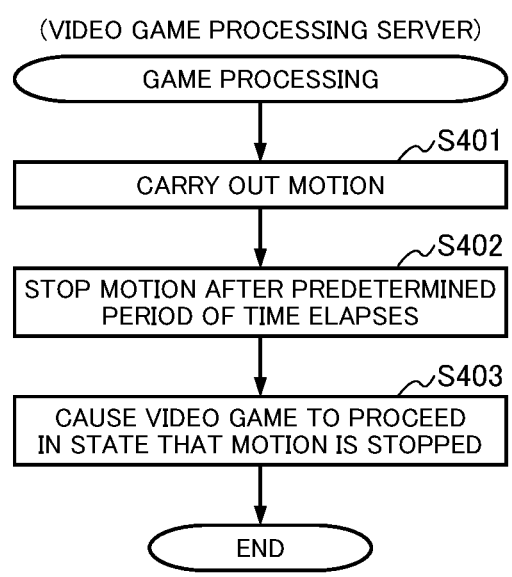
FIG. 9 is a flowchart showing an example of an operation of the server side in the game processing corresponding to at least one of the embodiments according to the present invention.

FIG. 9 is a flowchart showing an example of an operation of the server 10C side in the game processing. Here, an operation of the server 10C according to the video game processing system 100 will be described.

The server 10C carries out processing to cause an object to carry out a process to execute a motion specified on the basis of an operation of a user (Step S401). In principle, the object that is caused to carry out the motion is controlled so as to continuously carry out a series of actions until the motion operation is terminated. However, in a case where it is specified how many seconds is the motion stopped after the start of the motion at the same time of receiving an input operation to cause the object to carry out the motion, the stopping section 12C causes the motion in the middle of execution to stop the specified period of time elapses since the object starts to carry out the motion (Step S402). Even though the motion in the middle of execution is caused to stop, the server 10C causes the video game to proceed in a state where the motion of the object is caused to stop on the way (Step S403).

As explained above, as one side of the third embodiment, the server 10C provided with the functions to control progress of the video game in response to an operation of the user is configured so as to include the motion control section 11, the stopping section 12C, and the proceeding section 13. Thus, the stopping section 12C can specify that the motion is stopped after the predetermined period of time elapses since the object is caused to carry out the motion. Therefore, it is possible to facilitate photographing so that a posture of the object in the middle of the motion becomes a posture desired by the user.

Namely, it is possible to specify that the motion is stopped after the predetermined period of time elapses since the object is caused to carry out the motion. Thus, in a case where the object is caused to stop the motion in a state where the posture of the object is deviated from a posture of the object that the user wants to stop, a method of specifying a period of time to stop (for example, seconds) allows to adjust the posture of the object in more detail by making fine adjustments of the specified seconds. Therefore, it is possible for the posture of the object to further approach the posture desired by the user.

Fourth Embodiment

Figure 10:
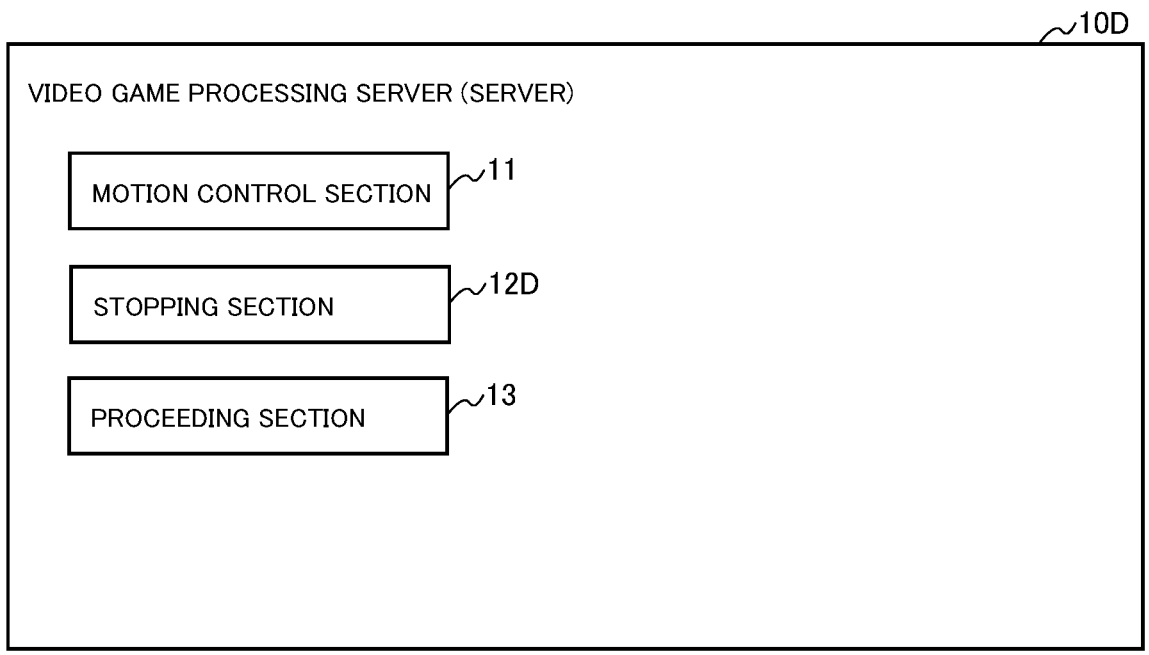
FIG. 10 is a block diagram showing a configuration of a video game processing server corresponding to at least one of the embodiments according to the present invention.

FIG. 10 is a block diagram showing a configuration of a video game processing server 10D (hereinafter, referred to as a "server 10D"), which is an example of the configuration of the server 10. As shown in FIG. 10, the server 10D at least includes a motion control section 11, a stopping section 12D, and a proceeding section 13.

The stopping section 12D has a function to cause a motion, which an object is carrying out, to stop on the way on the basis of a function of the motion control section 11. Moreover, the stopping section 12D also has a function for frame advance processing (or frame feed processing), in which the motion can be advanced or returned for every predetermined unit, from a state where the motion of the object is stopped by a function of the stopping section 12D. The predetermined unit denotes a unit used when a motion is advanced or returned. The predetermined unit when a motion is advanced or returned by a frame advance processing function may be one that can be specified by time (second) or one that can be specified by image frame units, for example. Further, as a concrete method for the frame advance processing, a method of carrying out a process to advance or return a posture of an object in the middle of a motion for every predetermined unit whenever an operation button corresponding to a direction to advance the stopped motion and a direction to return the stopped motion is inputted by the user is thought, for example. In this regard, by preparing plural sets of predetermined units, the user may carry out the frame advance processing easily. For example, the stopping section 12D may be configured so that plural predetermined units each of which a frame advance rate (or a frame feed rate) is different from each other are prepared like 1 frame, 10 frames, or 30 frames by the image frame units and the user can select the predetermined units for the frame advance processing.

Figure 11:
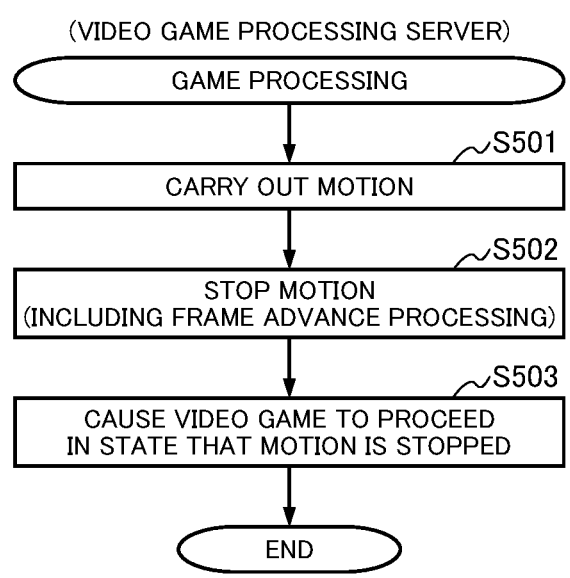
FIG. 11 is a flowchart showing an example of an operation of the server side in the game processing corresponding to at least one of the embodiments according to the present invention.

FIG. 11 is a flowchart showing an example of an operation of the server 10D side in the game processing. Here, an operation of the server 10D in the video game processing system 100 will be described.

The server 10D carries out processing to cause an object to carry out a process to execute a motion specified on the basis of an operation of a user (Step S501). In principle, the object that is caused to carry out the motion is controlled so as to continuously carry out a series of actions until the motion operation is terminated. However, in a case where a predetermined condition to stop the motion is satisfied in the middle of causing the object to carry out the motion, the server 10D causes the motion in the middle of execution to stop (Step S502). Moreover, in a case where the user desires, the server 10D carries out frame advance processing to advance or return the stopped motion for every predetermined unit on the basis of an instruction of the user (Step S502). Even though the motion in the middle of execution is caused to stop, the server 10D causes the video game to proceed in a state where the motion of the object is caused to stop on the way (Step S503).

As explained above, as one side of the fourth embodiment, the server 10D provided with the functions to control progress of the video game in response to an operation of the user is configured so as to include the motion control section 11, the stopping section 12D, and the proceeding section 13. Thus, the stopping section 12D can carry out the frame advance processing, in which the motion can be advanced or returned for every predetermined unit, from the state where the motion of the object is stopped by a function of the stopping section 12D. Therefore, it is possible to facilitate photographing so that a posture of the object in the middle of the motion becomes a posture desired by the user.

Namely, in a case where the posture of the object that is caused to carry out the motion and stop the motion on the way is slightly deviated from a posture of the object that the user wants to stop, the frame advance processing allows the posture of the object to become a posture desired by the user by making fine adjustments of the posture from the stopped state of the object without restarting the execution and stop of the motion from the beginning. Therefore, it becomes possible to efficiently carry out a work until the posture of the object becomes the posture desired by the user.

Fifth Embodiment

Figure 12:
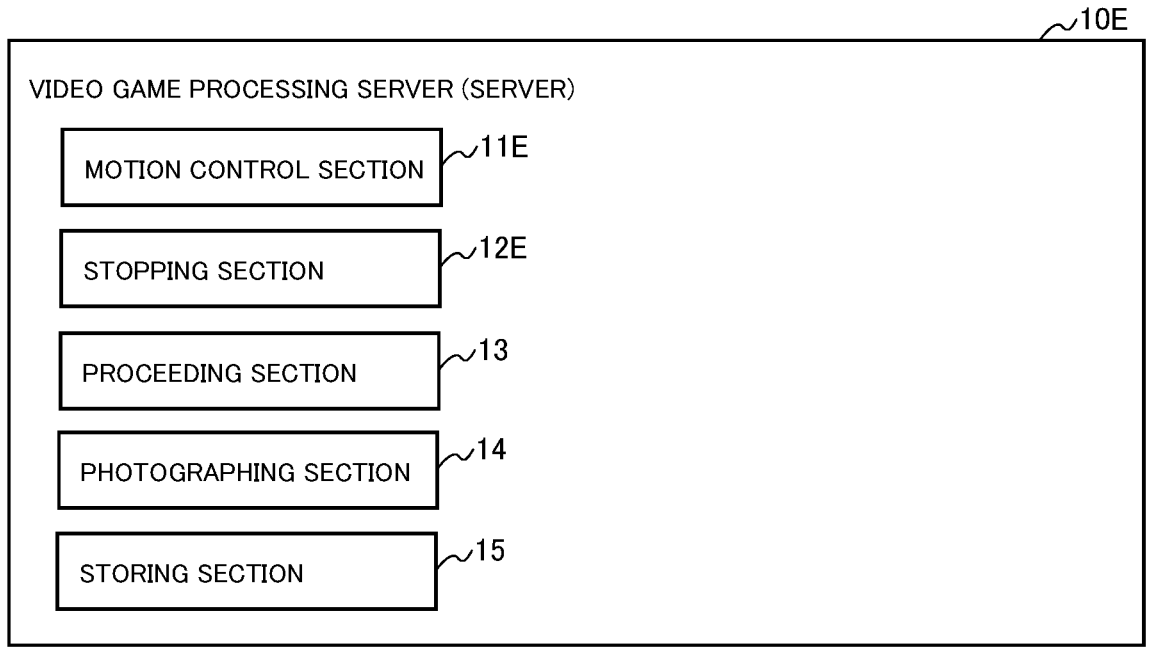
FIG. 12 is a block diagram showing a configuration of a video game processing server corresponding to at least one of the embodiments according to the present invention.

FIG. 12 is a block diagram showing a configuration of a video game processing server 10E (hereinafter, referred to as a "server 10E"), which is an example of the configuration of the server 10. As shown in FIG. 12, the server 10E at least includes a motion control section 11E, a stopping section 12E, a proceeding section 13, a photographing section 14, and a storing section 15.

The motion control section 11E has a function to cause an object to carry out a motion specified by a user. As the object that may appear in a video game, an object that is an operational target by the user himself or herself, an object that is an operational target by other user, an object that is a non-player character acting without an operation of any user, and the like are thought. In the present embodiment, the motion control section 11E has a function to cause not only the object that is the operational target of the user himself or herself but also the object that is the operational target of other user, the object that is the non-player character acting without an operation of any user, and the like to carry out the motion specified individually or at the same time.

The stopping section 12E has a function to cause the motion, which the object is carrying out, to stop on the way on the basis of the function of the motion control section 11E. Further, the stopping section 12E has a function to cause the motions, which not only the object that is the operational target of the user himself or herself, but also the object that is the operational target of other user, the object that is the non-player character acting without an operation of any user, and the like are respectively carrying out, to stop individually or at the same time.

The photographing section 14 has a function to carryout photographing on the basis of a point of view of a virtual camera that is arranged at a predetermined position within a virtual space of the video game. Further, the photographing section 14 also has a posing function to cause a line of sight of a face of the object or a front side of the object in a state where the object stopped the motion on the basis of a function of the stopping section 12E to be turned in a direction at which the virtual camera is positioned at the time of photographing. As for the virtual camera that is arranged in the virtual space of the video game in which the object is arranged, the virtual camera is placed at a predetermined position determined in advance and has a predetermined photographing angle. Alternatively, the server 10E may be configured so that the user can arbitrarily adjust the position, the photographing angle and the like of the virtual camera. The server 10E may also be configured so that the user is allowed to select whether the object carries out the posing function in a case where the user carries out an input operation corresponding to the shutter to carry out photographing of the object on the basis of a function of the photographing section 14. In the posing function, the object looks into the virtual camera every image (hereinafter, referred to also as a "camera sight line"). Further, the server 10E may be configured so that the object looks into the virtual camera (or carries out the camera sight line) in a moment of the photographing in the posing function. Alternatively, the server 10E may be configured so that the object always looks into the virtual camera without timing of photographing in a case where the user carries out a process to turn on the posing function.

The storing section 15 has a function to store data necessary for causing an object to carry out a series of actions for every motion. As the necessary data, there are data on actions that the object expressed by three-dimensional polygons is caused to carry out in a case where expression or presentation of the object is carried out by the three-dimensional polygons, for example. In this regard, other information necessary for the game processing in the video game is also stored in the storing section 15.

Figure 13:
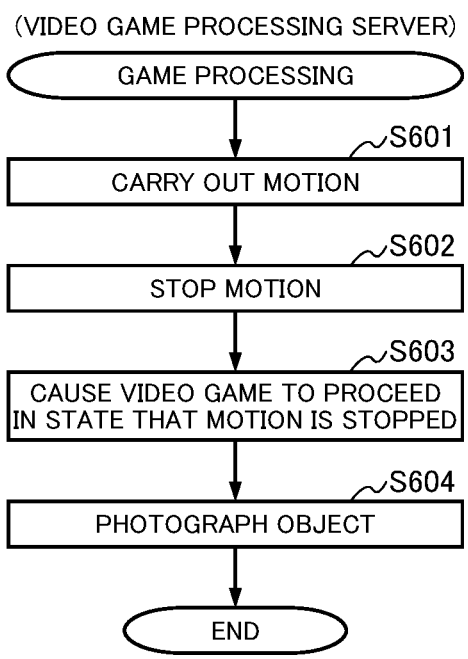
FIG. 13 is a flowchart showing an example of an operation of the server side in the game processing corresponding to at least one of the embodiments according to the present invention.

FIG. 13 is a flowchart showing an example of an operation of the server 10E side in the game processing. Here, an operation of the server 10E in the video game processing system 100 will be described.

The server 10E carries out a process to cause the object to carry out the motion specified on the basis of an operation of the user (Step S601). At this time, it is possible to cause not only the object that is the operational target of the user himself or herself, but also the object that is the operational target of other user, the object that is the non-player character acting without an operation of any user, and the like to carry out the motions, which are respectively specified individually or at the same time. In principle, the object that is caused to carry out the motion is controlled so as to continuously carry out a series of actions until the motion operation is terminated. However, in a case where a predetermined condition to stop the motion is satisfied in the middle of causing the object to carry out the motion, the server 10E causes the motion in the middle of execution to stop (Step S602). At this time, it is possible to cause the motions, which not only the object that is the operational target of the user himself or herself, but also the object that is the operational target of other user, the object that is the non-player character acting without an operation of any user, and the like are respectively carrying out, to stop individually or at the same time. Even though the motion in the middle of execution is caused to stop, the server 10E causes the video game to proceed in a state where the motion of the object is caused to stop on the way (Step S603). Then, the server 10E carries out photographing of the object on the basis of the point of view of the virtual camera that is arranged at the predetermined position within the virtual space of the video game in response to a predetermined input operation regarding the photographing of the user, and stores a photographed image in the storing section 15, for example (Step S604). At this time, so long as the posing function is carried out, the photographing is carried out in a state where the line of sight of the face of the object or the front side of the object is caused to be turned in the direction of the virtual camera.

As explained above, as one side of the fifth embodiment, the server 10E provided with the functions to control progress of the video game in response to an operation of the user is configured so as to include the motion control section 11E, the stopping section 12E, the proceeding section 13, the photographing section 14, and the storing section 15. Thus, the motion control section 11E can cause not only the object that is the operational target of the user himself or herself, but also the object that is the operational target of other user, the object that is the non-player character acting without an operation of any user, and the other objects that appear in the video game to carry out the motions, which are respectively specified individually or at the same time. Further, the stopping section 12E can cause the motions, which not only the object that is the operational target of the user himself or herself, but also the object that is the operational target of other user, the object that is the non-player character acting without an operation of any user, and the other objects that appear in the video game to stop individually or at the same time. Therefore, it is possible to facilitate photographing so that a posture of the object in the middle of the motion becomes a posture desired by the user.

Namely, it is possible to cause not only the object that is the operational target of the user himself or herself, but also the object that is the operational target of other user, the object that is the non-player character acting without an operation of any user, and the like to carry out the motions, which are respectively specified individually or at the same time. Further, it is also possible to cause the motions that the above objects are carrying out to stop individually or at the same time. Thus, in a case where any of users wants to take a group photograph of a plurality of objects, each of the users is not required to carry out and stop a motion of his or her object, but one user (who wants to take a group photograph) is allowed to specify, carry out, and/or stop a motion of each of the plurality of objects. Therefore, it becomes possible to carry out photographing while one user adjusts a composition of a group photograph or a pose of each object.

Sixth Embodiment

Figure 14:
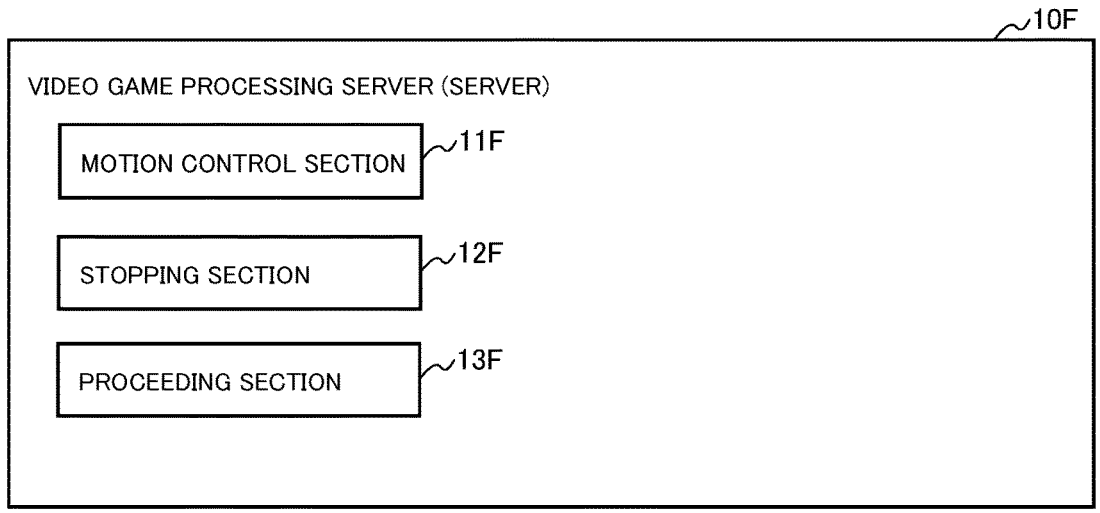
FIG. 14 is a block diagram showing a configuration of a video game processing server corresponding to at least one of the embodiments according to the present invention.

FIG. 14 is a block diagram showing a configuration of a video game processing server 10F (hereinafter, referred to as a "server 10F", which is an example of the configuration of the server 10 in the video game processing system 100 (see FIG. 1, hereinafter, referred to as the "system 100"). As shown in FIG. 14, the server 10F at least includes a motion control section 11F, a stopping section 12F, and a proceeding section 13F.

The motion control section 11F has a function to cause an object to carryout a motion specified by a user. As examples of the object that appears in the video game, there are an object that is an operational target of the user himself or herself, an object that is an operational target of other user, an object that is a non-player character acting without an operation of any user, and the like. In the present embodiment, the motion control section 11F has a function to cause not only the object that is the operational target of the user himself or herself but also the object that is the operational target of other user, the object that is the non-player character acting without an operation of any user, and the like to carry out the motion specified individually or at the same time.

The stopping section 12F has a function to cause the motion, which the object is carrying out, to stop on the way on the basis of the function of the motion control section 11F. Further, the stopping section 12F also has a function to cause the motion, which not only the object that is the operational target of the user himself or herself, but also the object that is the operational target of other user, the object that is the non-player character acting without an operation of any user, and the like is carrying out, to stop individually or at the same time.

The proceeding section 13F has a function to cause the video game to proceed in a state where the motion of the object is stopped on the way on the basis of the function of the stopping section 12F. Even though the motion of the object is stopped on the way on the basis of the function of the stopping section 12F, the proceeding section 13F does not cause progress of the video game to stop, but continuously cause the video game to proceed. The process of the proceeding section 13F is different from a conventional temporally stopping process (or a pausing process) in which the whole video game stops due to a rest or the like for the user. The proceeding section 13F stops only the object, but continues to cause the video game to proceed.

In the present embodiment, the case where a plurality of users and non-player characters form a group and a user carries out photographing of objects of the other users and the non-player characters that made the group together with the user who wants to carry out a photographing operation (hereinafter, referred to as a "group posing mode") will be described as an example. Here, the group mentioned herein may be one that refers to all members of a party in a case where users and/or non-player characters form the party together in the video game, or one that refers to a set of users and/or non-player characters that is formed for photographing temporarily.

Figure 15:
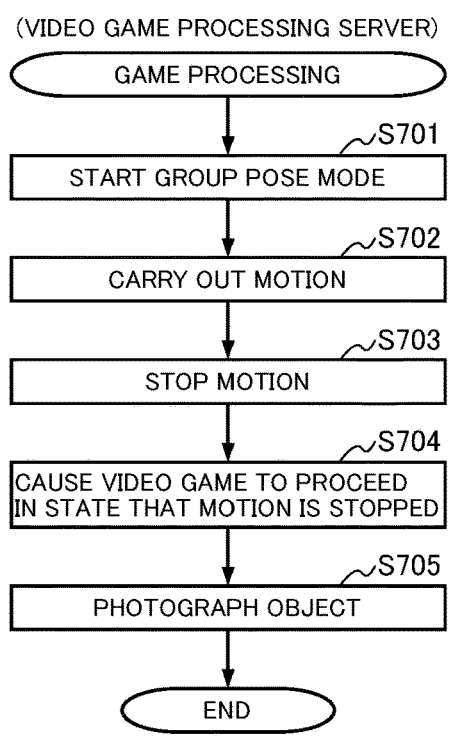
FIG. 15 is a flowchart showing an example of an operation of the server side in the game processing corresponding to at least one of the embodiments according to the present invention.

FIG. 15 is a flowchart showing an example of an operation of the server 10F side in the game processing. Here, an operation of the server 10F in the video game processing system 100 will be described.

The server 10F starts a group posing mode on the basis of a predetermined operation by the user who wants to carry out photographing (Step S701). The server 10F carries out a process to cause the object to carry out the motion specified on the basis of an operation of the user (Step S702). At this time, it is possible to cause not only the object that is the operational target of the user himself or herself, but also the object that is the operational target of other users who composes the group, the object that is the non-player character, which composes the group and acts without an operation of any user, and the like to carry out the motions, which are respectively specified individually or at the same time.

In principle, the object that is caused to carry out the motion is controlled so as to continuously carry out a series of actions until the motion operation is terminated. However, in a case where a predetermined condition to stop the motion is satisfied in the middle of causing the object to carry out the motion, the server 10F causes the motion in the middle of execution to stop (Step S703). At this time, it is possible to cause the motions, which not only the object that is the operational target of the user himself or herself, but also the object that is the operational target of other user, the object that is the non-player character acting without an operation of any user, and the like are respectively carrying out, to stop individually or at the same time. A stop operation to stop the motion may be one that is carried out on the basis of a predetermined input operation of the user, or one by which the user specifies that the motion is stopped after a predetermined period of time elapses. Further, the server 10F may be configured so that the user is allowed to carry out frame advance processing to advance or return the stopped motion for every predetermined unit after the motion is stopped.

Even though the motion in the middle of execution is caused to stop, the server 10F causes the video game to proceed in a state where the motion of the object is caused to stop on the way (Step S704).

In a case of carrying out photographing through these processes, the server 10F carries out photographing of the object on the basis of the point of view of the virtual camera that is arranged at the predetermined position within the virtual space of the video game in response to a predetermined input operation regarding the photographing of the user (Step S705). At this time, the server 10F may be configured so as to be capable of photographing in a state where a line of sight of a face or a front side of each of all the objects that composes the group is caused to be turned in a direction of the virtual camera by providing and carrying out a posing function to cause each of the objects looks into the virtual camera every image.

As explained above, as one side of the sixth embodiment, the server 10E provided with the functions to control progress of the video game in response to an operation of the user is configured so as to include the motion control section 11F, the stopping section 12F, and the proceeding section 13F. Thus, the motion control section 11F can cause not only the object that is the operational target of the user himself or herself, but also the object that is the operational target of other user, the object that is the non-player character acting without an operation of any user, and the other objects that appear in the video game to carry out the motions, which are respectively specified individually or at the same time. Further, the stopping section 12F can cause the motions, which not only the object that is the operational target of the user himself or herself, but also the object that is the operational target of other user, the object that is the non-player character acting without an operation of any user, and the other objects that appear in the video game to stop individually or at the same time. Therefore, it is possible to facilitate photographing so that a posture of the object in the middle of the motion becomes a posture desired by the user.

Namely, it is possible to cause not only the object that is the operational target of the user himself or herself, but also the object that is the operational target of other user, the object that is the non-player character acting without an operation of any user, and the like to carry out the motions, which are respectively specified individually or at the same time. Further, it is also possible to cause the motions that the above objects are carrying out to stop individually or at the same time. Thus, in a case where any of users wants to take a group photograph of a plurality of objects that composes a group, each of the users is not required to carry out and stop a motion of his or her object, but one user (who wants to take a group photograph) is allowed to specify, carry out, and/or stop a motion of each of the plurality of objects. Therefore, it becomes possible to carry out photographing while one user adjusts a composition of a group photograph or a pose of each object. Accordingly, in a case of taking a group photograph, it becomes possible to facilitate photographing after the user causes all of the objects to respectively take postures desired by the user, and this makes it possible for the user to carry out ideal photographing.

In this regard, in each of the first to sixth embodiments described above, a situation after the motion of the object is stopped has not been described. However, the user is allowed to release the stopped state by carrying out a predetermined input operation and to carry out the continuation of the motion, for example. In such a case, the system 100 may be configured so that the motion whose continuation is carried out can further be stopped on the way. On the other hand, in a case where the stopped state of the motion is caused to keep releasing, the motion is carried out to the end thereof.

Further, in each of the first to sixth embodiments described above, the case where a series of actions defined as a motion is carried out only once has been described. However, it is not limited to this case. The system 100 may be configured so as to repeatedly carryout the motion several times continuously. Alternatively, the system 100 may be configured so as to continue to carry out the motion repeatedly unless the user releases such a mode. It is preferable for the user that the motion is continuously repeated in a case where the user wants to carry out a stop operation after the user observes a flow of the whole motion several times and grasps shutter timing for the motion.

In the sixth embodiment described above, even though the server 10F is configured so as to form a group and carry out photographing, the proceeding section 13F continues to cause the video game to proceed as it is. However, the configuration of the server 10F is not always limited to this configuration. For example, the server 10F may be configured so that data of objects of a plurality of users and non-player characters that are members of a group and scene data of a virtual space at that time are stored in a storing section of the user terminal 20 and any one user is allowed to carry out photographing by causing the other members of the group to carry out and stop the motion at timing other than timing when the members of the group play the video game. By configuring the server 10F in this manner, other user is not required to wait for photographing even though one user spends time on the photographing. Therefore, there is a merit that the one user can deeply consider and examine a composition of photographing.

Further, in each of the first to sixth embodiments described above, the case where motions (that is, a series of actions) stored in the storing section in advance are prepared and a user is allowed to arbitrarily select and use one of the prepared motions has been described. However, the system 100 may be configured so that the user is allowed to customize a motion by himself or herself. Various kinds of customizing methods are thought, but the customizing method may be one in which elements of the actions that constitute the motion are combined. By allowing the motion to be customized, there is an effect that it is possible to increase amusement of or interest in the photographing. Further, the system 100 may be configured so that data on the customized motion are stored in a storing section of other user terminal than the user terminal 20 and other user who uses the other user terminal is allowed to use any of the customized motions thus stored. In this case, the system 100 may be configured so that the user of the user terminal 20 causes the data on the customized motions to be stored in a storing section of the server 10 and other user who wants to use any of the customized motions is allowed to download and use the desired customized motion into the user terminal appropriately.

As explained above, one or two or more shortages can be solved by each of the embodiments of the present application. In this regard, the effects according to each of the embodiments are non-limiting effects or one example of the non-limiting effects.

In this regard, in each of the embodiments described above, each of the plurality of user terminals 20 and 201 to 20N and the server 10C carries out the various kinds of processing described above in accordance with various kinds of control programs (for example, a video game processing program) stored in the storage device with which the corresponding terminal or server is provided.

Further, a configuration of the system 100 is limited to the configuration that has been explained as an example of each of the embodiments described above. For example, the system 100 may be configured so that part or all of the processing that has been explained as the processing carried out by the user terminal is carried out by the server 10, or it may be configured so that part or all of the processing that has been explained as the processing carried out by the server 10 is carried out by any of the plurality of user terminals 20 and 201 to 20N (for example, the user terminal 20). Further, the system 100 may be configured so that a part or all of the storing sections included by the server 10 is included in any of the plurality of user terminals 20 and 201 to 20N. Namely, the system 100 may be configured so that a part or all of the functions included in any one of the user terminal 20 and the server 10A according to the system 100 is included in the other.

Further, the program may be configured so as to cause a single apparatus that does not include a communication network to realize a part or all of the functions that have been explained as the examples of the respective embodiments described above.

In this regard, the word "in accordance with progress of the video game" means that occurrence of various kinds of progress or changes and the like that can be generated in the video game becomes timing or a standard of a specific process. As examples of the specific process, there are a determining process, an information updating process, and the like. Further, as examples of the various kinds of progress or changes that can be generated in the video game, there are progress of time, a change in a game element value, a specific status or update of a flag, an operation input by the user, and the like.

(Appendix)

The explanation of the embodiments described above has been described so that the following inventions can be at least realized by a person having a normal skill in the art to which the present invention belongs.

(1)

A non-transitory computer-readable medium including a video game processing program product for causing a server to realize functions to control progress of a video game in response to an operation of a user, wherein the functions include:

a motion control function configured to refer to a storing section to cause an object to carry out a motion specified by the user, a series of actions (hereinafter, referred to as a "motion") being stored in the storing section in advance, the object being to be caused to carry out the series of actions;

a stopping function configured to cause the motion, which the object is carrying out, to stop on the way on the basis of an operation of the user; and a proceeding function configured to cause the video game to proceed in a state where the motion of the object is stopped on the way on the basis of the stopping function.

(2)

The non-transitory computer-readable medium according to claim 1), wherein the stopping function includes a function configured to cause the motion of the object to stop when a predetermined input operation of the user is received.

(3)

The non-transitory computer-readable medium according to claim (1) or (2), wherein the stopping function includes a function configured to specify that the motion is stopped after a predetermined period of time elapses since the object was caused to carry out the motion.

(4)

The non-transitory computer-readable medium according to any one of claims (1) to (3), wherein the stopping function includes a frame advance processing function configured to advance or return the motion for every predetermined unit from the state where the stopping function stops the motion of the object.

(5)

The non-transitory computer-readable medium according to any one of claims (1) to (4), wherein the functions further include:

a photographing function configured to carry out photographing on the basis of a point of view of a virtual camera, the virtual camera being arranged at a predetermined position within a virtual space of the video game, and wherein the photographing function includes a posing function configured to cause a line of sight of a face of the object or a front side of the object in a state where the object stopped the motion on the basis of the stopping function to be turned in a direction at which the virtual camera is positioned at the time of photographing.

(6)

The non-transitory computer-readable medium according to any one of claims (1) to (5), wherein the object includes at least one selected from a group consisting of: an object that is an operational target of the user; an object that is an operational target of other user; an object that is a non-player character acting without an operation of any of the users; and other object that appears in the video game, and wherein the motion control function includes a function configured to cause the object to carry out the motion specified individually or at the same time.

(7)

The non-transitory computer-readable medium according to any one of claims (1) to (6), wherein the object includes at least one selected from a group consisting of: an object that is an operational target of the user; an object that is an operational target of other user; an object that is a non-player character acting without an operation of any of the users; and other object that appears in the video game, and wherein the stopping function includes a function configured to cause the motion of the object to stop individually or at the same time.

(8)

A non-transitory computer-readable medium including a video game processing program product for causing a user terminal to realize at least one function of the functions that the video game processing program product described in any one of claims (1) to (7) causes the server to realize, the user terminal being capable of communicating with the server.

(9)

A server into which the video game processing program product included in the non-transitory computer-readable medium according to any one of claims (1) to (8) is installed.

(10)

A non-transitory computer-readable medium including a video game processing program product for causing a user terminal to realize functions to control progress of a video game in response to an operation inputted into the user terminal by a user, wherein the functions include:

a motion control function configured to refer to a storing section to cause an object to carry out a motion specified by the user, a series of actions (hereinafter, referred to as a "motion") being stored in the storing section in advance, the object being to be caused to carry out the series of actions;

a stopping function configured to cause the motion, which the object is carrying out, to stop on the way on the basis of an operation of the user; and a proceeding function configured to cause the video game to proceed in a state where the motion of the object is stopped on the way on the basis of the stopping function.

(11)

A non-transitory computer-readable medium including a video game processing program product for causing a user terminal to realize functions to control progress of a video game in response to an operation of a user, wherein the functions include:

a motion control function configured to refer to a storing section to cause an object to carry out a motion specified by the user, a series of actions (hereinafter, referred to as a "motion") being stored in the storing section in advance, the object being to be caused to carry out the series of actions;

a stopping function configured to cause the motion, which the object is carrying out, to stop on the way on the basis of an operation of the user; and a proceeding function configured to cause the video game to proceed in a state where the motion of the object is stopped on the way on the basis of the stopping function.

(12)

A non-transitory computer-readable medium including a video game processing program for causing a server to realize at least one function of the functions that the video game processing program product described in claim (11) causes the user terminal to realize, the server being capable of communicating with the user terminal.

(13)

A user terminal into which the video game processing program product included in the non-transitory computer-readable medium according to any one of claims (10) to (12) is installed.

(14)

A video game processing system for controlling progress of a video game in response to an operation of a user, the video game processing system including a communication network, a server, and a user terminal, the video game processing system comprising:

a motion control section configured to refer to a storing section to cause an object to carry out a motion specified by the user, a series of actions (hereinafter, referred to as a "motion") being stored in the storing section in advance, the object being to be caused to carry out the series of actions;

a stopping section configured to cause the motion, which the object is carrying out, to stop on the way on the basis of an operation of the user; and a proceeding section configured to cause the video game to proceed in a state where the motion of the object is stopped on the way on the basis of a function of the stopping section.

(15)

The video game processing system according to claim (14), wherein the server includes the motion control section, the stopping section, and the proceeding section, and wherein the user terminal includes:

a transmitting/receiving section configured to transmit and receive information regarding the video game; and an outputting section configured to output a game screen on a display screen of a display device.

(16)

A video game processing method of controlling progress of a video game in response to an operation of a user, the video game processing method comprising:

a motion control process configured to refer to a storing section to cause an object to carry out a motion specified by the user, a series of actions (hereinafter, referred to as a "motion") being stored in the storing section in advance, the object being to be caused to carry out the series of actions;

a stopping process configured to cause the motion, which the object is carrying out, to stop on the way on the basis of an operation of the user; and a proceeding process configured to cause the video game to proceed in a state where the motion of the object is stopped on the way on the basis of the stopping process.

(17)

A video game processing method executed by a video game processing system to control progress of a video game in response to an operation inputted to a user terminal by a user, the video game processing system comprising a communication network, a server, and the user terminal, the video game processing method comprising:

a motion control process configured to refer to a storing section to cause an object to carry out a motion specified by the user, a series of actions (hereinafter, referred to as a "motion") being stored in the storing section in advance, the object being to be caused to carry out the series of actions;

a stopping process configured to cause the motion, which the object is carrying out, to stop on the way on the basis of an operation of the user; and a proceeding process configured to cause the video game to proceed in a state where the motion of the object is stopped on the way on the basis of the stopping process.

According to one of the embodiments of the present invention, it is useful to encourage a user to use an in-game element widely in a video game.

What is claimed is:

1. A non-transitory computer-readable medium including a video game processing program product for causing a server to control progress of a video game in response to an operation of a user, the video game processing program product, when executed, causing the server to perform operations comprising:
    causing, by referring to a storage medium, an object to carry out a motion specified by the user, the motion including a series of actions, the series of actions being stored in the storage medium in advance, the object being caused to carry out the series of actions as the motion;
    causing the video game to proceed in a state on a basis of an operation of the user, with the state including, in the video game and from among the motion which is carried out by the object and a second motion of a second object operated by a second user, only the motion which is carried out by the object being stopped;
    causing the video game, including the second motion of the second object, to continue to proceed in the state, with the motion of the object being stopped; and
    causing, in the state, the motion of the object to return by a predetermined number of frames or by a predetermined unit of time and then stop on a basis of a second operation of the user,
    wherein the motion of the object is caused to stop during the series of actions on the basis of the operation of the user without the series of actions being canceled.

2. The non-transitory computer-readable medium according to claim 1,
    wherein the motion of the object is caused to stop when a predetermined input operation of the user is received.

3. The non-transitory computer-readable medium according to claim 1,
    wherein the server specifies that the motion of the object is stopped after a predetermined period of time elapses since the object is caused to carry out the motion.

4. The non-transitory computer-readable medium according to claim 1, the operations further comprising:
    carrying out photographing on a basis of a point of view of a virtual camera, the virtual camera being arranged at a predetermined position within a virtual space of the video game, and
    wherein the photographing causes a line of sight of a face of the object or a front side of the object in the state where the motion of the object is stopped to be turned in a direction at which the virtual camera is positioned at a time of the photographing.

5. The non-transitory computer-readable medium according to claim 1,
    wherein the object includes at least one selected from a group consisting of: an object that is an operational target of the user; an object that is an operational target of an other user; an object that is a non-player character acting without an operation of any user; and an other object that appears in the video game, and
    wherein the object is caused to carry out the motion individually or at a same time as an other object.

6. The non-transitory computer-readable medium according to claim 1,
    wherein the object includes at least one selected from a group consisting of: an object that is an operational target of the user; an object that is an operational target of an other user; an object that is a non-player character acting without an operation of any user; and an other object that appears in the video game, and
    wherein the motion of the object is caused to stop individually or at a same time as an other object.

7. A server into which the non-transitory computer-readable medium according to claim 1 is installed.

8. The non-transitory computer-readable medium according to claim 1,
    wherein the second operation consists of a single operation by the user.

9. A non-transitory computer-readable medium including a video game processing program product for causing a user terminal to control progress of a video game in response to an operation of a user, the video game processing program product, when executed, causing the user terminal to perform operations comprising:
    causing, by referring to a storage medium, an object to carry out a motion specified by the user, the motion including a series of actions, the series of actions being stored in the storage medium in advance, the object being caused to carry out the series of actions as the motion;
    causing the video game to proceed in a state on a basis of an operation of the user, with the state including, in the video game and from among the motion which is carried out by the object and a second motion of a second object operated by a second user, only the motion which is carried out by the object being stopped;
    causing the video game, including the second motion of the second object, to continue to proceed in the state, with the motion of the object being stopped; and
    causing, in the state, the motion of the object to return by a predetermined number of frames or by a predetermined unit of time and then stop on a basis of a second operation of the user,
    wherein the motion of the object is caused to stop during the series of actions on the basis of the operation of the user without the series of actions being canceled.

10. A video game processing system for controlling progress of a video game in response to an operation of a user, the video game processing system comprising:
    a server; and
    a user terminal in communication with the server via a communication network,
    wherein at least one of the server and the user terminal is configured to perform operations, the operations including:
    causing, by referring to a storage medium, an object to carry out a motion specified by the user, the motion including a series of actions, the series of actions being stored in the storage medium in advance, the object being caused to carry out the series of actions as the motion;
    causing the video game to proceed in a state on a basis of an operation of the user, with the state including, in the video game and from among the motion which is carried out by the object and a second motion of a second object operated by a second user, only the motion which is carried out by the object being stopped;
    causing the video game, including the second motion of the second object, to continue to proceed in the state, with the motion of the object being stopped; and causing, in the state the motion of the object to return by a predetermined number of frames or by a predetermined unit of time and then stop on a basis of a second operation of the user, wherein the motion of the object is caused to stop during the series of actions on the basis of the operation of the user without the series of actions being canceled.

\* \* \* \* \*